Figure 4:
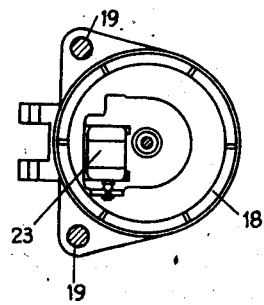

Feb. 29, 1944.     G. GUERCI     2,342,801
METHOD OF MANUFACTURING FIBRO-CEMENT PIPE
Filed Feb. 21, 1940     2 Sheets-Sheet 1
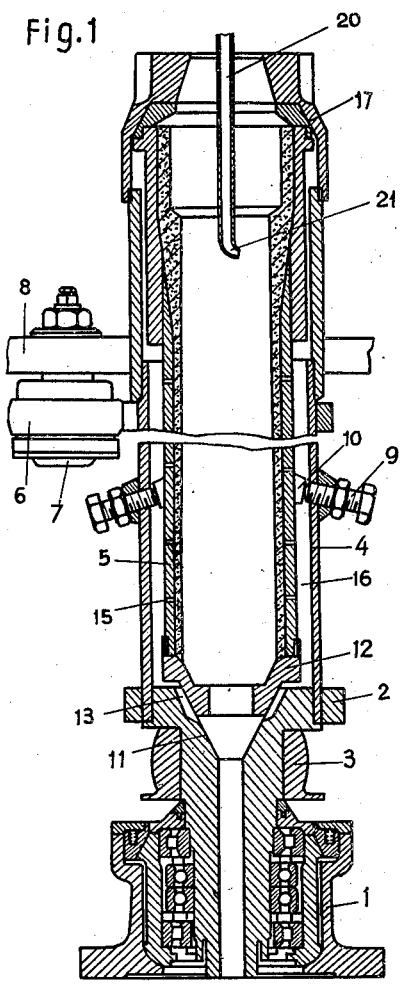
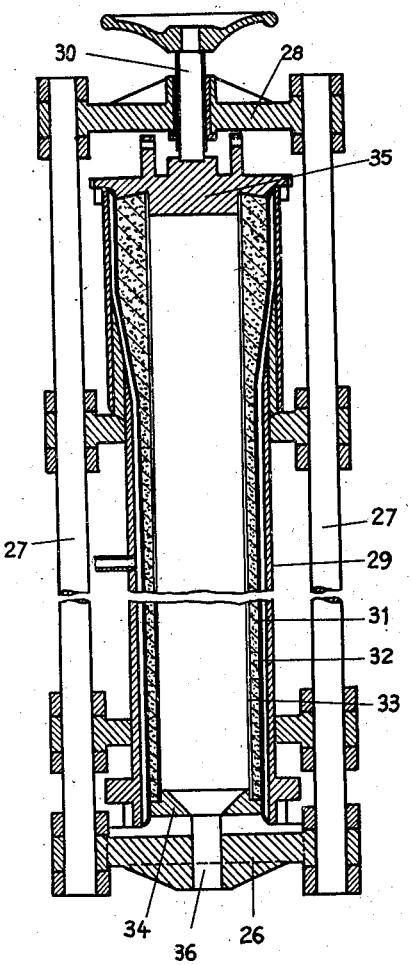
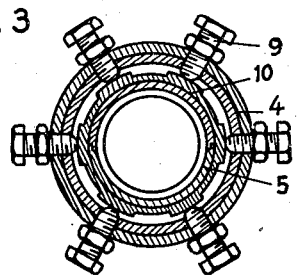
Inventor
G. Guerci
By: Glascock Downing & Seebold
Attys.

Feb. 29, 1944.    G. GUERCI    2,342,801
METHOD OF MANUFACTURING FIBRO-CEMENT PIPE
Filed Feb. 21, 1940    2 Sheets-Sheet 2

Inventor,
G. Guerci
By: Glascock Downing & Seebold

Patented Feb. 29, 1944

2,342,801

UNITED STATES PATENT OFFICE 2,342,801

METHOD OF MANUFACTURING FIBROCEMENT PIPE

Giovanni Guerci, Turin, Italy; vested in the Alien Property Custodian

Application February 21, 1940, Serial No. 320,199
In Luxemburg February 25, 1939

2 Claims. (Cl. 25—154)

This invention relates to a method of centrifugally moulding fibro-cement pipes, such as asbestos-cement pipes, and an apparatus therefor.

Centrifugal moulding has already been employed for manufacturing hollow concrete piles, but it has not heretofore been suggested to apply it to the manufacture of fibro-cement pipes. Researches and experiments carried out by applicant have shown that centrifugal moulding is the best process for manufacturing fibro-cement pipes, as centrifugation surprisingly improves feltering of the fibres, so that the centrifugated tube immediately takes a consistency such that it can be stripped from the mould before the cement has set.

According to this invention, the material is fed to the mould in the form of a ribbon, which is helically coiled on the mould wall. During feeding the mould is rotated at a relatively low speed, as 1000 turns per minute, which varies according to the diameter of the tube, in order to avoid too high centrifugal forces which would lead to a stratification of the constituents of the mass. On completion of feeding, the rotational speed is increased to twice or three times the initial number of turns (for instance to about 3000 turns per minute) in order to separate the mixing water and compress the material.

By utilizing the property of the fibro-cement pipe according to this invention to maintain its shape before the setting of the cement, as soon as it is stripped out of the mould the pipe can be advantageously subjected to a compression in order to further improve its strength. For this purpose it is placed on a mandrel having the same diameter as the final desired pipe diameter and a thoroughly smooth surface, and it is brought in this condition into an apparatus in which it is subjected to a centripetal compression with hydraulic or pneumatic means. This gives a pipe of a highly compact structure, which is much stronger than pipes obtained by the known methods of manufacture and has a perfectly smooth inner surface.

It has already been proposed to subject cement pipes to hydraulic or pneumatic compression operating from the inside towards the outside. This compression in a centrifugal direction unavoidably causes an expansion of the inner surface of the tube being formed, which gives rise to unevenness and discontinuities that are exaggerated, in the case of fibro-cement, by the presence of fibres.

This drawback is fully eliminated by the centripetal compression according to this invention.

The accompanying drawings show, by way of example, a simple apparatus for carrying out the process according to this invention.

Figure 2:
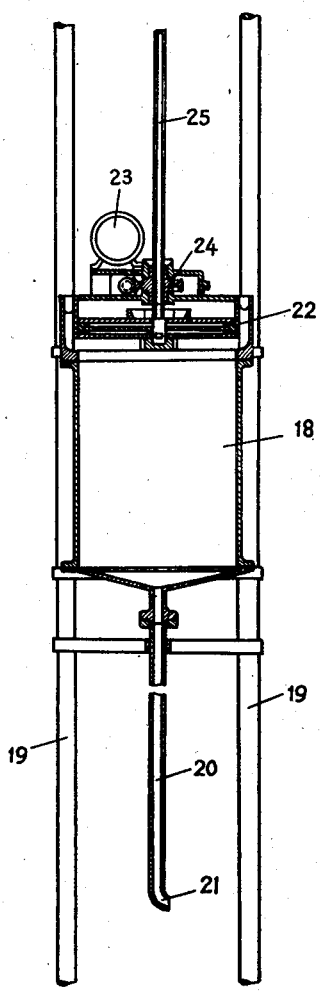
Figure 5:
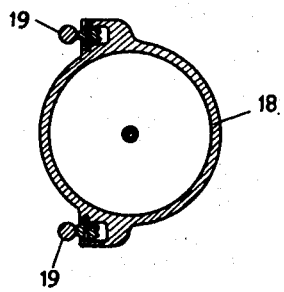

Figure 1 is an axial section of the mould;
Figure 2 is an axial section of the feed device;
Figure 3 is a section on line III—III of Fig. 1;
Figure 4 is a top view of the feed device;
Figure 5 is a view from underneath and
Figure 6 is an axial longitudinal section of the centripetal compression device.

Referring to the drawings, 1 denotes a support having mounted thereon on ball and roller bearings the base plate 2 provided with a drive pulley 3 and to which a tubular member 4 adapted to support the mould 5 is fixed.

The tubular member 4 is kept centered as it revolves at high speed by means of rollers 6 mounted on pivots 7 fixed to a platform 8 and is provided with a circular row of centering screws 9 engaging with an annular row of projections 10 having an upwardly flared outer conical surface. The mould is further kept centered at the bottom by means of the conical seat 11 in the base plate, receiving the conical bottom 12 of the mould. The seat 11 is formed with ducts 13, through which the excess water from the material is discharged to the outside through the central bore 14 in the support. For this purpose the mould 5 is provided with radial holes 15, so that during centrifugation the excess water flows into the annular space 16 between the mould and mould carrier and, as soon as the action of the centrifugal force ceases, it flows down to the outlet.

The mould 5 is locked in position simply by means of the cap 17 screwed on the mould carrier so that, as feeding is completed, it may easily be withdrawn by removing the cap and slightly rotating the mould in order to clear the projections 10 from the screws 9.

A feeding container 18 is provided above the mould carrier and is mounted for vertical displacement on guide columns 19.

The material is fed by a long tube 20 ending by a delivery nozzle 21 and axially reaching within the mould 5. The material is forced through the nozzle by means of a piston 22 slidably mounted in the container and operated by an electric motor 23 which drives a worm wheel 24 screwed on the threaded rod 25 of the piston.

Under the action of the piston 22 the material is extruded through the nozzle 21 arranged with its axis in a horizontal direction and is forced in the form of a ribbon towards the wall of the mould, on which it deposits by effect of the vertical displacement of the container and nozzle in a coiled form and is compressed by the centrifugal force so as to form a uniform layer in which the fibre has undergone a thorough felting process, so as to bind together the cement particles and make the tube consistent enough to enable its removal from the mould as soon as it is formed.

The ratio between the speed of the motion of the container and the speed at which the material is extruded controls the thickness of the tube wall. Obviously, however, this thickness may be reached by one or a plurality of strokes of the distributor; in the latter case the fibres will be disposed along superposed coils, that may be alternatively right-handed and left-handed by suitably reversing the direction of movement of the container.

Of course, hydraulic or pneumatic means may be employed instead of the piston for feeding the material, or the gravity alone may be utilised.

When the pipe has reached the desired thickness, the mould is withdrawn with the pipe from the mould-carrier, the pipe is stripped from the mould and, if necessary, it is placed on a mandrel and brought to the compressing apparatus shown in Figure 6.

This apparatus consists of a frame comprising a lower bulkhead, columns 27 and an upper bulkhead 28, and a tubular member 29 that may be secured to the frame by means of the set screw 30 provided with a hand wheel.

A hose, for instance of rubber, is arranged in the bore of the tubular member 29 having the same profile as the outer surface of the pipe to be manufactured. Under normal pressure the hose has an inner diameter smaller than the outer diameter of the finished fibro-cement tube, in order to avoid wrinkles during the compressing operation. To enable the tube under manufacture, which is of a larger diameter, to be placed into the hose, the space between the hose 31 and tubular member 29 is evacuated; as the latter expands, a space is left free for introducing the fibro-cement tube 32.

As soon as the tube 32 is stripped, it is inserted into the tubular mandrel 33, which is then introduced into the expanded hose 29 and clamped by means of the screw 30 between the covers 34 and 35; the latter serve also for tightly securing the hose to the ends of the tubular member 29.

As the tubular member 29 together with the tube 32 is mounted into the frame a liquid or a gas under the desired pressure is supplied to the space between said member and the hose, so as to compress the material in a centripetal direction against the mandrel. With this operation the material is strongly compressed, thereby considerably improving feltering of the fibres and making the structure very compact and strong.

The mandrel 33 is provided with holes for the discharge of the excess water in the material, which is thus freely exhausted through the axial bore 36.

After compression and after the cement has set, the pipe 32 is submitted to the usual reaming operation for forming the socket joint.

The inner wall of the finished fibro-cement tube is also advantageously provided either by electrolysis, atomizing or any other suitable process with a metallic coating, in order to reduce the resistance to the flow of liquids or gases, make the wall fully water-tight and avoid any contamination or alteration of the fluids or gases conveyed by the tube.

What I claim is:

1. A method of manufacturing fibro-cement pipes which comprises the steps of forming a relatively thick mass of fibrous material and cement, projecting said mass in the form of a ribbon on the inner wall of a mould by means of a nozzle performing an alternating axial movement in said mould so as to form on said wall helical superposed alternatively right-handed and left-handed layers, said mould being rotated at a relatively low speed for preventing stratification of the material, successively increasing the speed of the mould for consolidating said superposed layers by means of centrifugal force and discharging excess water from the mass radially through holes in said wall, removing the pipe from the mould before setting of cement, supporting the inner surface of the pipe by inserting a mandrel therein, and applying centripetal fluid pressure to the outer surface of the pipe to compress the same before setting of the cement.

2. A method of manufacturing fibro-cement pipes which comprises the steps of, forming a relatively thick mass of fibrous material and cement, projecting said mass in the form of a ribbon on the inner wall of a mould by means of a nozzle performing an alternating axial movement in said mould so as to form on said wall helical superposed alternatively right-handed and left-handed layers, said mould being rotated at a relatively low speed for preventing stratification of the material, successively increasing the speed of the mould for consolidating said superposed layers by means of centrifugal force and discharging excess water from the mass radially through holes in said wall, removing the pipe from the mould before setting of cement, supporting the inner surface of the pipe by inserting a mandrel therein, introducing the mandrel with the pipe still in a plastic condition into a second mould having a rigid outer wall and a flexible and resilient inner wall, and contracting the resilient inner wall.

GIOVANNI GUERCI.